United States Patent [19]
Hallberg

[11] 3,744,333
[45] July 10, 1973

[54] DEVICE FOR CONNECTING AND DISCONNECTING ELECTRICAL OR MECHANICAL FUNCTIONS

[76] Inventor: Karl Johan Folke Hallberg, Egnahemsgatan 37, Varberg, Sweden

[22] Filed: May 1, 1972

[21] Appl. No.: 249,018

[30] Foreign Application Priority Data
May 14, 1971 Sweden.............................. 5738/71

[52] U.S. Cl. .................................. 74/437, 74/568
[51] Int. Cl. ............................................... F16h 55/04
[58] Field of Search ................... 74/25, 56, 112, 63, 74/568, 436, 437

[56] References Cited
UNITED STATES PATENTS

| | | | |
|---|---|---|---|
| 407,172 | 7/1889 | Cottrell................................. | 74/437 |
| 463,978 | 11/1891 | Allen .................................... | 74/437 |
| 1,720,189 | 7/1929 | Jackson ................................ | 74/568 |
| 2,621,495 | 12/1952 | Garbarini.............................. | 74/568 |

Primary Examiner—Charles J. Myhre
Assistant Examiner—Wesley S. Ratliff, Jr.
Attorney—J. King Harness, Ernest A. Beutler et al.

[57] ABSTRACT

A device for connecting and disconnecting electrical or mechanical functions in a continuous sequence, comprising a cam shaft the cam means of which bring about said connection and disconnection, respectively, upon rotation of the cam shaft. The cam shaft supports a toothed disc cooperating with a toothed segment rotatably mounted on a second shaft, running in parallel with the cam shaft, on which second shaft is also supported a disc element cooperating with a wheel mounted on the cam shaft. Immediately upon rotation of the cam shaft, a tooth on the toothed segment will move the toothed disc for displacement of the cam shaft to operative position, wherein it switches on said functions. As soon as cam shaft rotation ceases, the toothed segment together with the disc element will bring the cam shaft back to its inoperative position of rest for disconnection of said functions.

5 Claims, 6 Drawing Figures

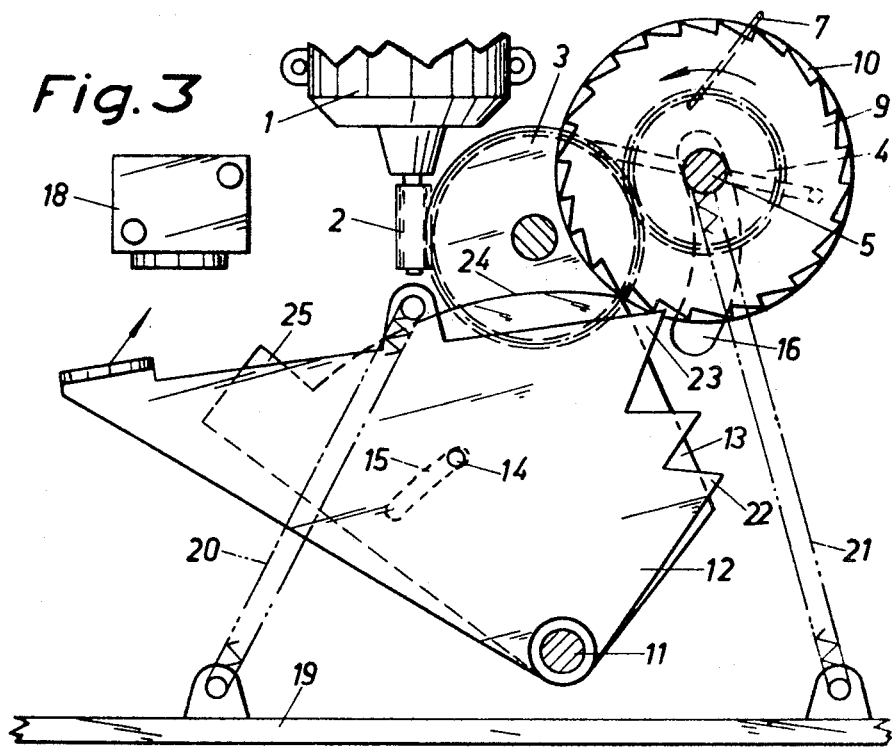
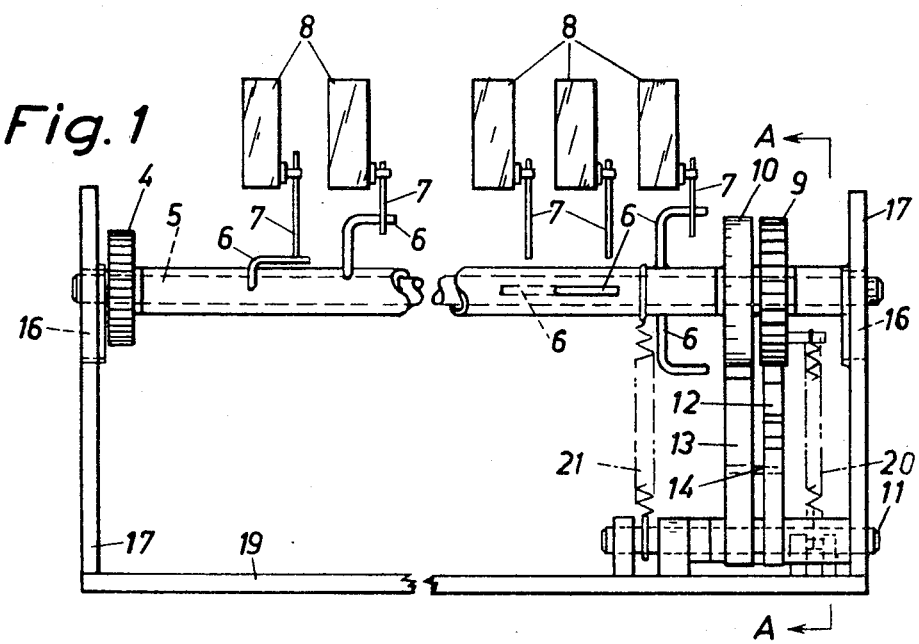

Patented July 10, 1973  3,744,333

DEVICE FOR CONNECTING AND DISCONNECTING ELECTRICAL OR MECHANICAL FUNCTIONS

BACKGROUND OF THE INVENTION

The present invention concerns a device for connecting and disconnecting in a continuous sequence a number of electrical or mechanical functions, said device comprising a cam shaft the cam means of which are arranged, upon rotation of the shaft, to connect and disconnect, respectively, said functions in accordance with a predetermined programme.

A disadvantage connected with devices of this kind is that the moment the cam shaft stops, one or several of the cam means usually will be in an on-position. As far as electrical switches are concerned which are closed in this position, it might be necessary to separately open the circuits of the switches in question. For mechanical functions a corresponding, separate manipulation of one or several of the control means, operated by the cam surfaces, is required.

SUMMARY OF THE INVENTION

The purpose of the present invention is to provide, through simple means, interruption of all funtions upon cease of movement of the cam shaft. The invention is characterised in that the cam shaft is movable in a direction transverse relative to its longitudinal extension, towards and away from a position of rest to a position wherein the programme functions are connectable by means of the cam means, that the cam shaft is provided with a toothed disc and a wheel positioned adjacent said toothed disc, and that on a shaft, arranged in parallel with the cam shaft, is pivotally mounted a toothed segment section which cooperates with the toothed disc, and also a disc element which takes part in the pivotal movement of the toothed segment and cooperates with the wheel. When the cam shaft is in its position of rest the outermost tooth of the toothed segment is in position of engagement with the toothed disc and adapted, upon initial rotary movement of the cam shaft, to bring the toothed disc to advance stepwise from one tooth to the next of the toothed segment in order to displace the cam shaft transversely relative to its axis along a controlled path of movement while at the same time turning the toothed segment in a direction opposite to the direction of rotation of the toothed disc, past the opposite extreme tooth of the toothed segment, in which position the wheel is adapted to roll up onto an edge portion of the disc element and in doing so bring the cam sahft against the action of gravity or the action of a spring exercised on the toothed segment and disc element, to its position wherein it switches on the programme functions in question. As soon as the rotary movement of the cam shaft stops, the toothed segment will swing back together with the disc element, thus bringing the cam shaft to return to the position of rest. Through the arrangement in accordance with the invention is thus ensured that immediately upon starting the device, the cam shaft automatically will move from position of rest to connecting position and, when the device is stopped, the shaft will return to position of rest wherein its cam surfaces are completely separated from all electrical or mechanical operating means.

BRIEF DESCRIPTION OF THE DRAWINGS

The invention will be described more in detail in the following with reference to the acommpanying drawings, wherein FIG. 1 illustrates a front view of one embodiment of the device in accordance with the invention;

FIGS. 2-4 are sections along line A—A in FIG. 1, illustrating on an enlarged scale the device in various positions.

DETAILED DESCRIPTION OF A PREFERRED EMBODIMENT

Figure 2:
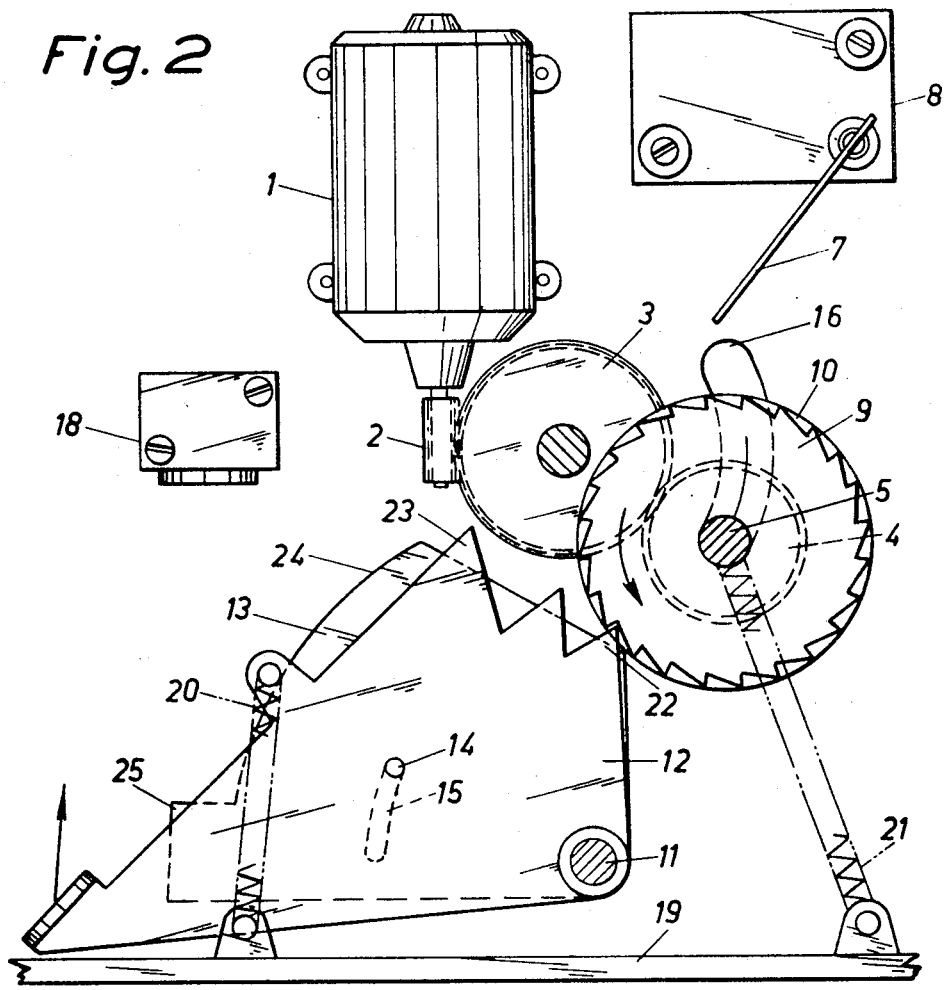
Figure 5:
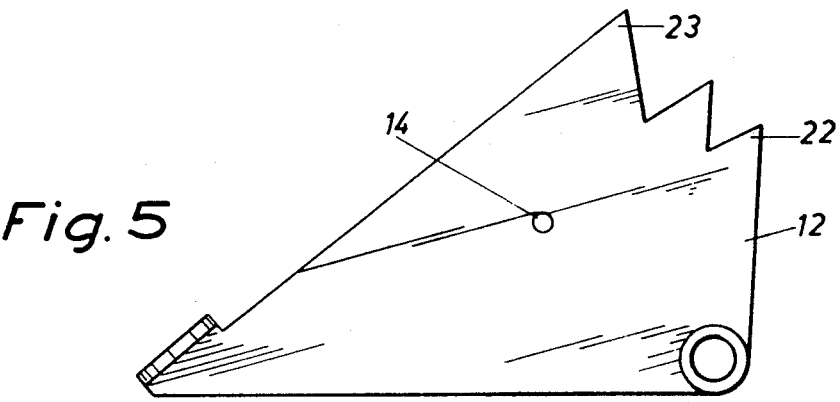
FIGS. 5 and 6 show details incorporated in the device in accordance with the invention.
Figure 4:
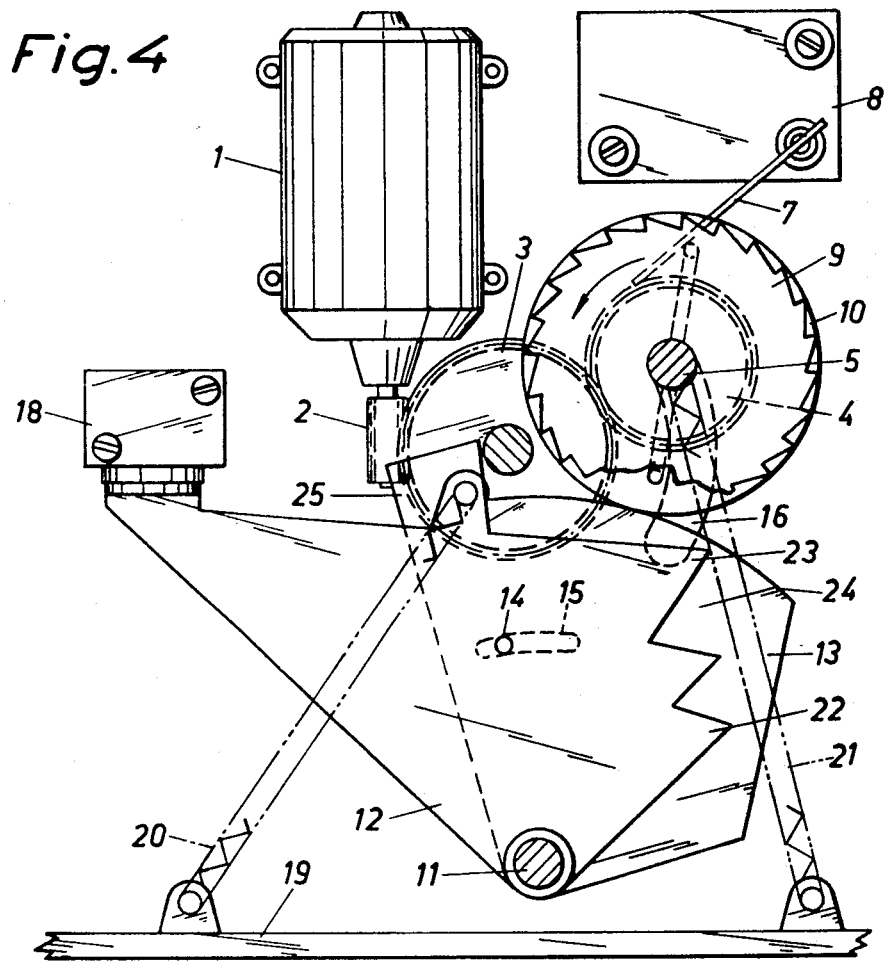
Figure 6:
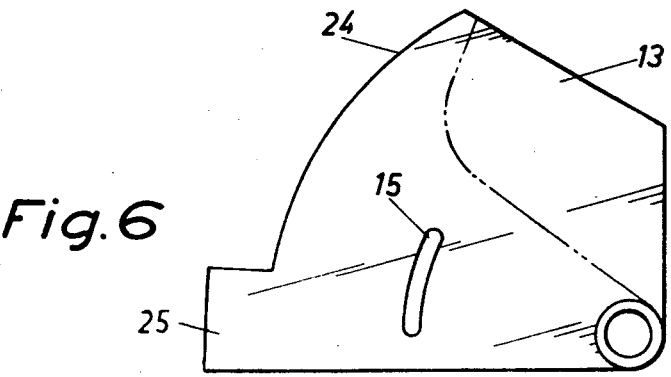

As an example of the invention has been chosen an electrical programming work incorporating an electric motor 1, a worm gear comprising a worm 2, and a cog wheel 3 which is connected to a drive wheel 4 mounted on a cam shaft 5. The latter is provided with cam pins 6, adapted to operate contact arms 7 on microswitches 8. The contact arms 7 are mounted for spring-loaded return. The microswitches 8 are adapted, when influenced by the rotation of the cam shaft 5, to close and open in sequence separate circuits, such closing and opening operations resulting in starting and stopping of functions of various kinds.

At its one side, the cam shaft 5 is provided with a toothed disc 9 adjacent which disc a wheel 10 is arranged. A toothed segment 12 adapted to cooperate with the toothed disc 9 is pivotably mounted on a shaft 11, which shaft is parallel with cam shaft 5. Adjacent the toothed segment 12 and pivotably mounted on the same shaft 11 as segment 12, there is a disc element 13, adapted to cooperate with the wheel 10. The movements of the toothed segment 12 and the disc element 13 likewise are coordinated for cooperation, which may be effected in various ways. In the example illustrated on the drawing the toothed segment 12 is provided with a pin 14 extending at right angles relatively the plane of the toothed segment into a slot 15 formed in the disc element 13. The cam shaft 5 rests by means of its extremities in arcuate openings 16 in brackets 17. Said arcuate openings 16 serve as guides for the cam shaft 5 when the latter moves from position of rest to connecting position and back.

The embodiment illustrated on the drawing likewise incorporates a few constructional details which considerably improve the operational reliability of the device but are not necessary per se. One of these details is an electric magnet 18 which is coupled in parallel with the electric motor 1 and adapted to keep the toothed segment 12, when swung upwards, in this upper position until the circuit is opened. Other details include a first spring means 20 extending between the support 19 and the disc element 13 (or toothed segment 12), and a second spring means 21 extending between the support 19 and the cam shaft 5.

The device operates as follows, it being assumed that the details are in the position illustrated in FIG. 2. The electric motor 1 is assumed to be at a standstill, and the cam shaft 5 then is in its position of rest. One extreme tooth 22 of the toothed segment 12 engages with the toothed disc 9. When the circuit of the electric motor closes, the cam shaft 5 commences its turning movement. The toothed disc 9 will then be advanced stepwise from one tooth to the next of the toothed segment 12 and make the cam shaft 5 follow the arcuate path of the openings 16. At the same time the toothed segment 12 will be swung upwards to the position illustrated in FIG. 3 wherein the toothed disc 9 has attained a position past the opposite extreme tooth 23 of the toothed segment. The disc element 13 has been brought along by the pin 14 in the swinging movement of the toothed segment 12 and now assumes a position wherein the wheel 10 may roll up onto an edge portion 24 of the disc element. As soon as the tooth 23 of the toothed segment 12 is freed from the toothed disc 9 the electric magnet 18 attracts the toothed segment. Wheel 10 continues to roll up the edge portion 24 of the disc element 13 to further displace the cam shaft 5 in the transverse direction until a stopper ridge 25 or other blocking element prevents further turning of the disc element 13. The cam shaft 5 has now reached the connecting position and in the following it will rotate about its own axis during connecting and disconnecting of the microswitches 8 in accordance with a predetermined programme.

When the circuit to the electric motor 1 is opened the electric magnet 18, coupled in parallel therewith, loses its attraction force on the toothed segment 12 which thereby swings back through gravitational force to the original position illustrated in FIG. 2 bringing along with it disc element 13, whereby the cam shaft 5 falls down into its position of rest. If, for some reason, the device is mounted in an upside-down position, the spring means 20 retracts toothed segment 12 and disc element 13 back to original positions and the spring means 21 cam shaft 5 to position of rest.

The invention provides a device having fully automatic operation. When the electric motor starts no additional operating means need be manipulated to bring the cam shaft 5 to connecting position, but the shaft will automatically move to this position. Still automatically, the cam shaft 5 will in this position interrupt its transverse movement and start turning about its own axis, driven by the drive wheel 4. When the electric motor 1 is stopped and the drive wheel 4 comes to a standstill, the cam shaft 5 immediately returns to its position of rest wherein the contact arms 7 cannot be influenced by the cam pins 6 and thus they keep their circuits open.

The invention is not limited to the embodiment as shown and described but may be varied in a number of ways within the scope of the appended claims. As mentioned before, the electric magnet 18 is not necessary for the functioning of the device per se but only serves to ensure that the cam shaft 5 is maintained in connecting position while the electric motor is working, also if the device is mounted in a position where it is exposed to shocks and vibrations.

The toothed segment 12 as well as the disc element 13 naturally may have configuration different from the one illustrated without departing from the inventive idea. The cooperation of the movements of the toothed segment 12 and the disc element 13 may be carried out through other means than the pin 14 and the slot 15.

The electrical programming works illustrated and described has been chosen by way of example only. It is obviously possible to replace the cam pins 6 by curved discs intended to act on hydraulic or pneumatic valves, mechanical levers or the like.

What I claim is:

1. An improved device for connecting and disconnecting in a continuous sequence a number of electrical or mechanical functions, said device comprising a cam shaft the cam means of which are arranged, upon rotation of the shaft, to connect and disconnect, respectively, said functions in accordance with a predetermined programme, the improvement comprising said cam shaft being movable in a direction transverse to its longitudinal extension towards and away from a position wherein said programme functions are connectable by means of said cam means, a toothed disc mounted on said cam shaft, a wheel mounted on said cam shaft in a position adjacent said toothed disc, a second shaft arranged in parallel with said cam shaft, a toothed segment section pivotally mounted on said second shaft for cooperating with said toothed disc on the cam shaft, and a disc element partaking in the pivotal movements of said toothed segment section and cooperating with said wheel on the cam shaft, one extreme tooth of said toothed segment section engaging in said toothed disc in position of rest of said cam shaft, said toothed segment section being adapted, upon initial rotary movement of said cam shaft, to bring said toothed segment section to advance stepwise from one tooth to the next of said toothed segment section to displace said cam shaft transversely relative to its axis along a controlled path of movement while simultaneously turning the toothed segment section in a direction opposite to the direction of rotation of said toothed disc, past the opposite extreme tooth of said toothed segment section, in which position said wheel on said cam shaft is adapted to roll up onto an edge portion of the disc element, thereby moving said cam shaft against the action of gravity or the action of a spring exercised on said toothed segment section and said disc element, to bring said cam shaft to the position thereof wherein it switches on the programme functions in question.

2. An improved device as claimed in claim 1, wherein a pin serving as a movement coordinating means between said toothed segment section and said disc element is arranged on said toothed segment section extending at right angles in relation to the toothed segment section plane into a slot formed in said disc element.

3. An improved device as claimed in claim 1, wherein an electric motor is provided to drive said cam shaft and an electric magnet is arranged to be connected and disconnected at the moment of connection and disconnection of said cam shaft drive engine, and to attract said toothed segment section when the latter swings forwards or upwards.

4. An improved device as claimed in claim 1, wherein a spring means is arranged to return said toothed segment section and said disc element to their original positions upon cease of motion of said cam shaft.

5. An improved device as claimed in claim 1, wherein a spring means is arranged to return said cam shaft to its position of rest upon cease of motion of said cam shaft.

* * * * *